(12) United States Patent
Jang

(10) Patent No.: US 11,726,708 B2
(45) Date of Patent: Aug. 15, 2023

(54) STORAGE DEVICE WHICH STORES WRITE DATA AND AN AUTHENTICATION CODE INTO A PROTECTED MEMORY BLOCK AND METHOD OF OPERATING THE SAME

(71) Applicant: SK hynix Inc., Gyeonggi-do (KR)

(72) Inventor: Eun Soo Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 16/941,054

(22) Filed: Jul. 28, 2020

(65) Prior Publication Data

US 2021/0255802 A1 Aug. 19, 2021

(30) Foreign Application Priority Data

Feb. 17, 2020 (KR) .................. 10-2020-0018811

(51) Int. Cl.
*G06F 3/06* (2006.01)
*G06F 21/64* (2013.01)
*G06F 21/44* (2013.01)

(52) U.S. Cl.
CPC .......... *G06F 3/0659* (2013.01); *G06F 3/0604* (2013.01); *G06F 3/0673* (2013.01); *G06F 21/44* (2013.01); *G06F 21/64* (2013.01)

(58) Field of Classification Search
CPC .... G06F 3/0659; G06F 3/0604; G06F 3/0673; G06F 21/44; G06F 21/64; G06F 3/0622;
(Continued)

(56) References Cited

U.S. PATENT DOCUMENTS

| 9,645,918 | B2 * | 5/2017 | Yun ..................... G06F 12/0246 |
| 2014/0189033 | A1 * | 7/2014 | Akahori .............. G06F 13/4282 |
| | | | 709/212 |

(Continued)

FOREIGN PATENT DOCUMENTS

| DE | 112015004863 T5 * | 8/2017 | .......... G06F 11/1441 |
| DE | 102019111130 A1 * | 2/2020 | .......... G06F 11/1012 |

(Continued)

OTHER PUBLICATIONS

Roosta S.H. (2000) Parallel Programming Approaches. In: Parallel Processing and Parallel Algorithms. Springer, New York, NY. https://doi.org/10.1007/978-1-4612-1220-1_4 (Year: 2000).*

(Continued)

*Primary Examiner* — Charles Rones
*Assistant Examiner* — Alexander Vinnitsky
(74) *Attorney, Agent, or Firm* — IP & T Group LLP

(57) ABSTRACT

Provided herein may be a storage device having improved write performance. The storage device may include a memory device and a memory controller. The memory controller may generate check-in information indicating start of a program operation in response to a write request received from the host, control the memory device to perform a program operation of storing data received from the host in a target area of the memory device, generate check-out information indicating whether the program operation has succeeded, and provide a write result response including the check-out information to the host in response to a write return request received from the host.

20 Claims, 16 Drawing Sheets

(58) Field of Classification Search
CPC ...... G06F 3/0637; G06F 3/0679; G06F 21/79; G06F 13/1668; G06F 3/061; G06F 3/0658; G06F 3/0614; G06F 12/06; G06F 12/1458
See application file for complete search history.

(56) References Cited

U.S. PATENT DOCUMENTS

| | | | |
|---|---|---|---|
| 2020/0050513 A1* | 2/2020 | Kim | G11C 29/42 |
| 2020/0135270 A1* | 4/2020 | Lee | G06F 12/0246 |
| 2020/0202919 A1* | 6/2020 | Byun | G11C 11/409 |
| 2020/0210100 A1* | 7/2020 | Li | G06F 3/0679 |

FOREIGN PATENT DOCUMENTS

| | | | |
|---|---|---|---|
| KR | 10-2017-0007580 | 1/2017 | |
| KR | 101993704 B1 * | 6/2019 | G06F 11/1441 |

OTHER PUBLICATIONS

JESD220D, Universal Flash Storage (UFS) Version 3.0, JEDEC Solid State Technology Association, Jan. 2018, pp. 1-386, Arlington, USA.

* cited by examiner

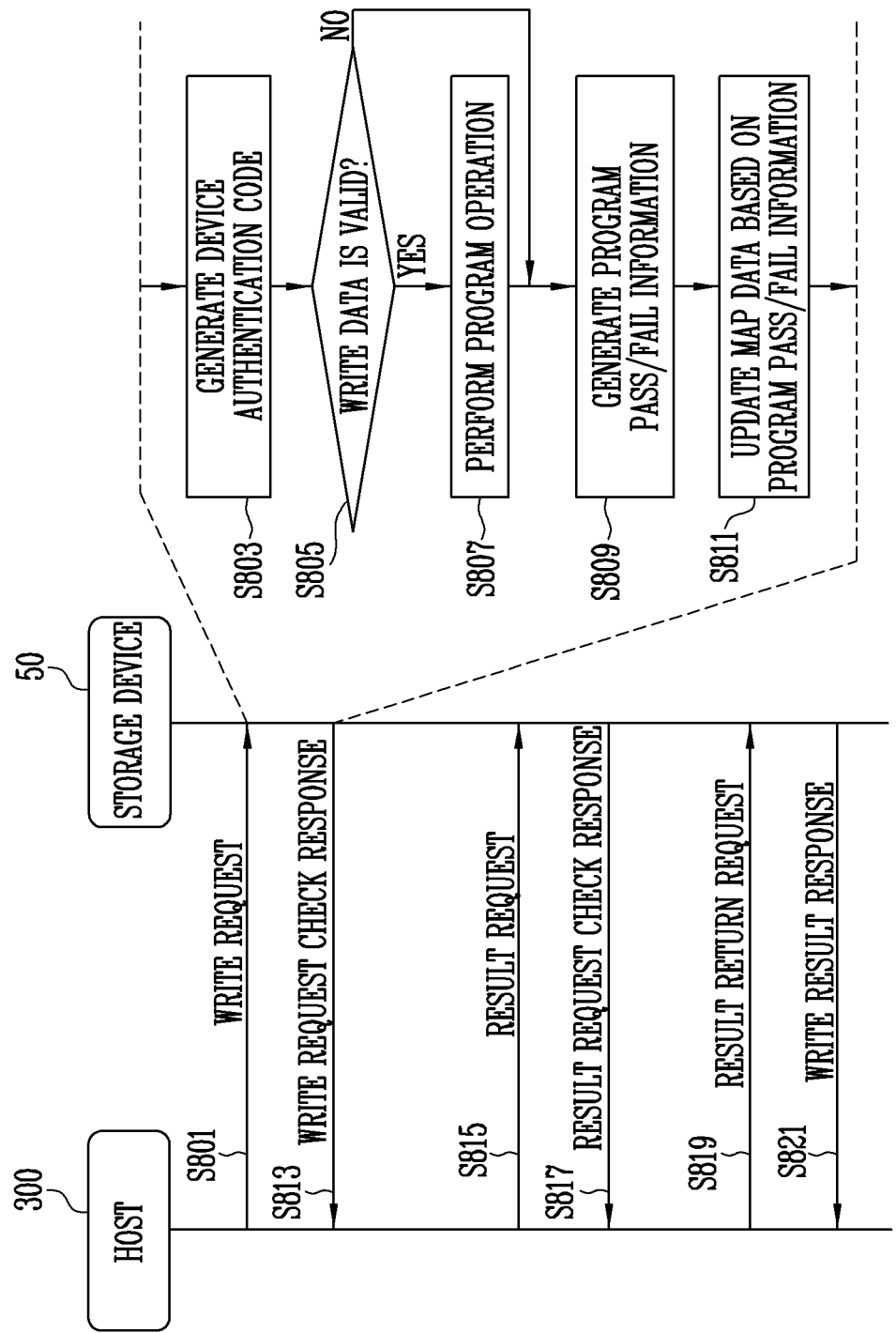

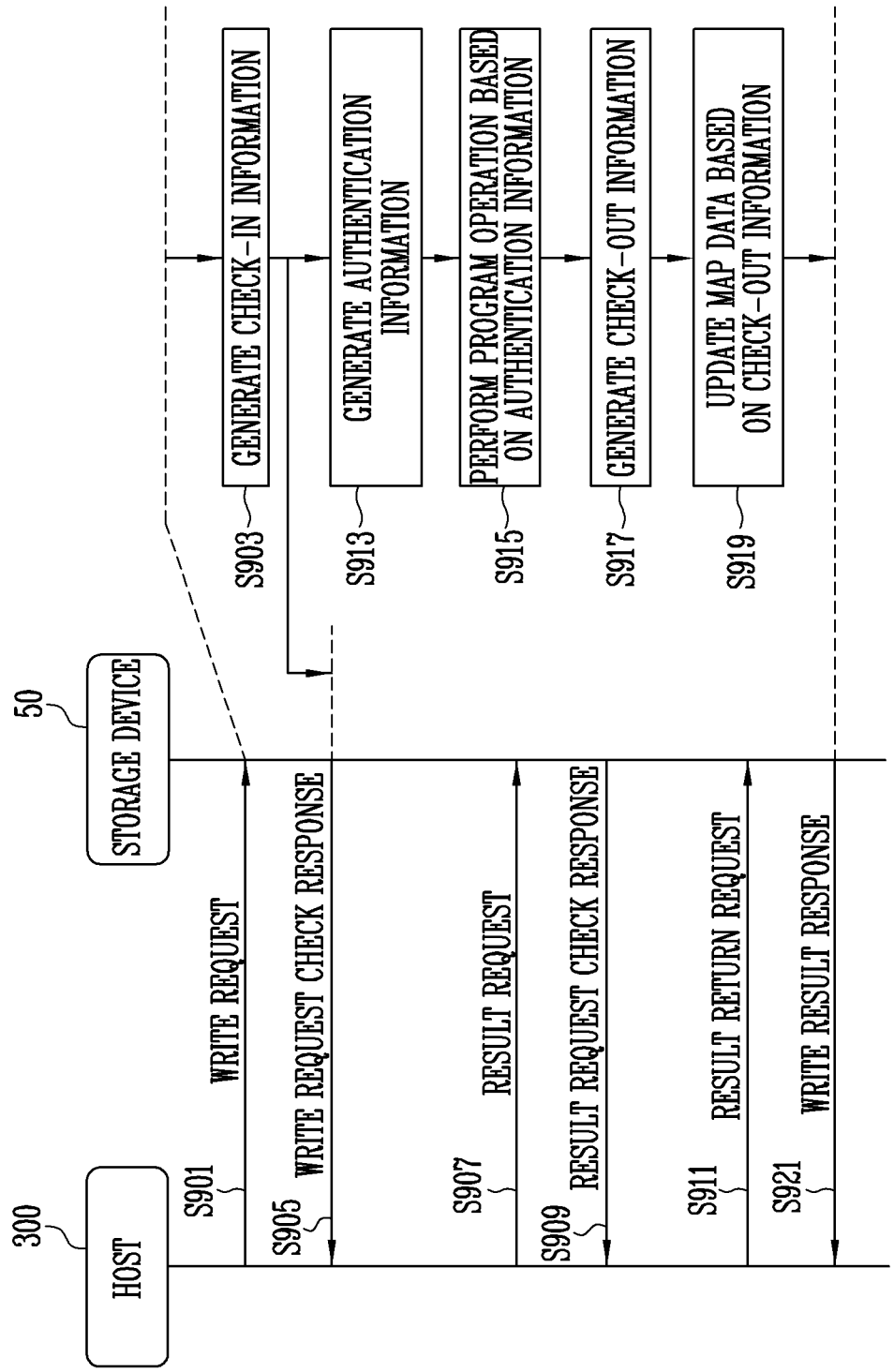

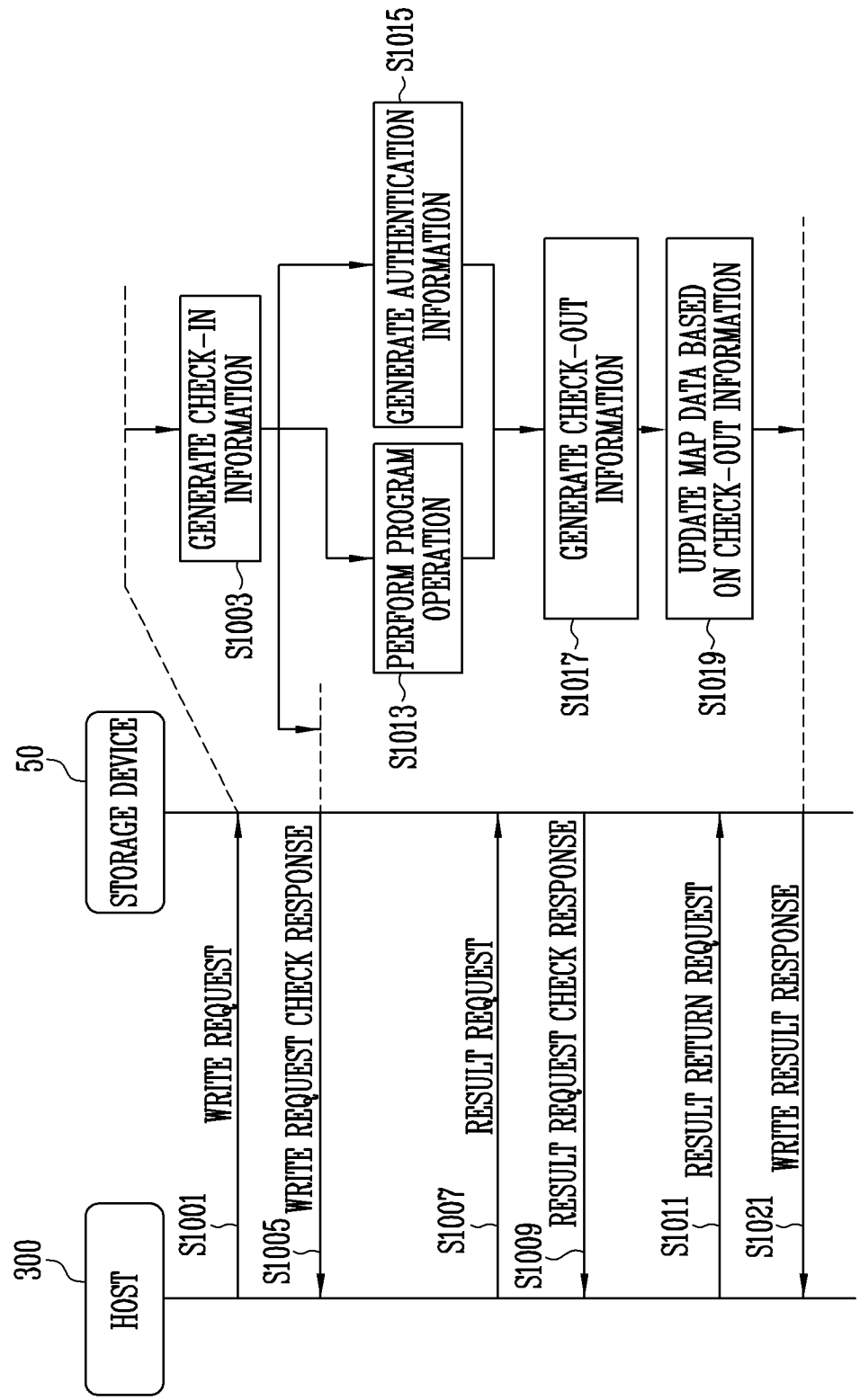

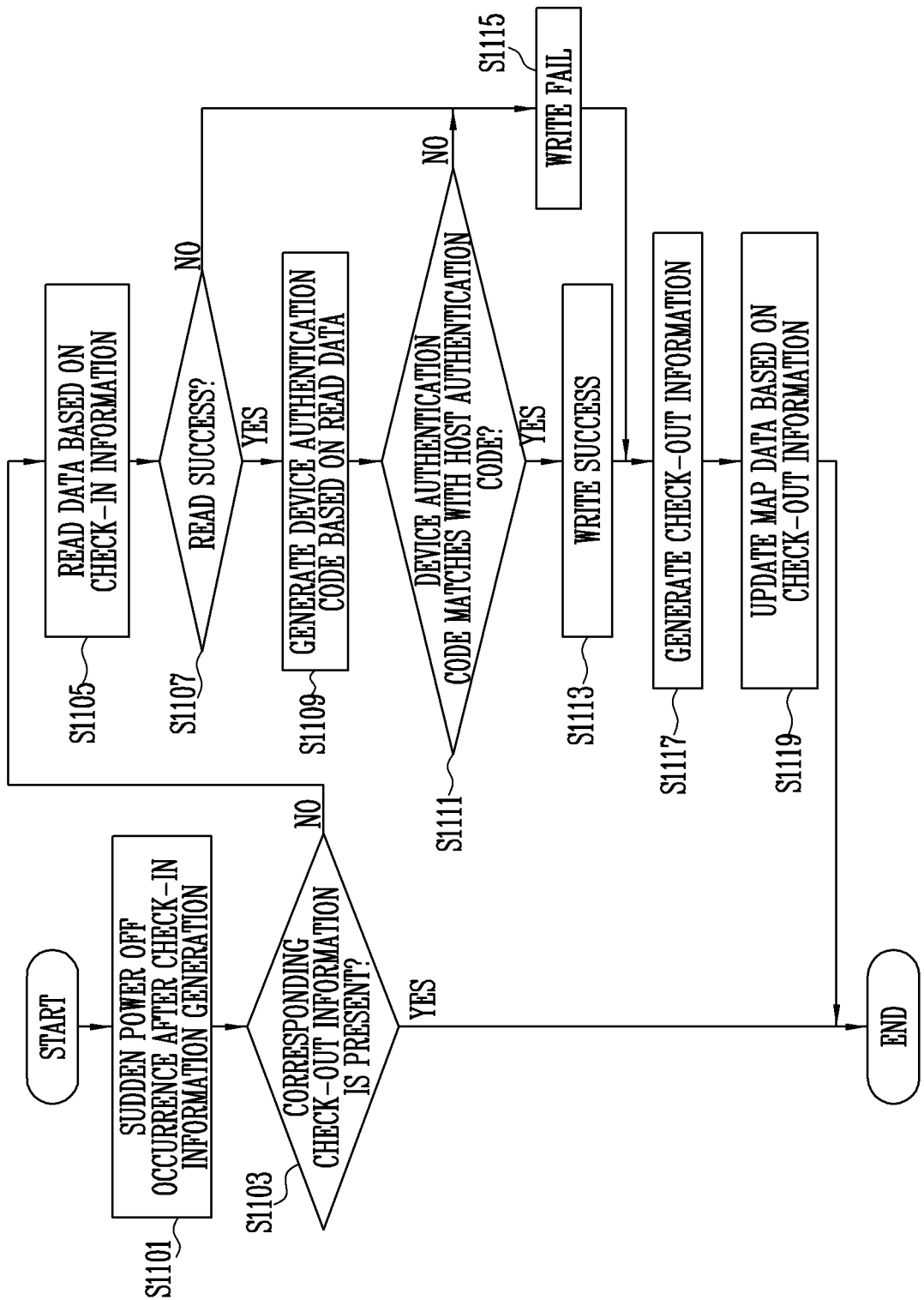

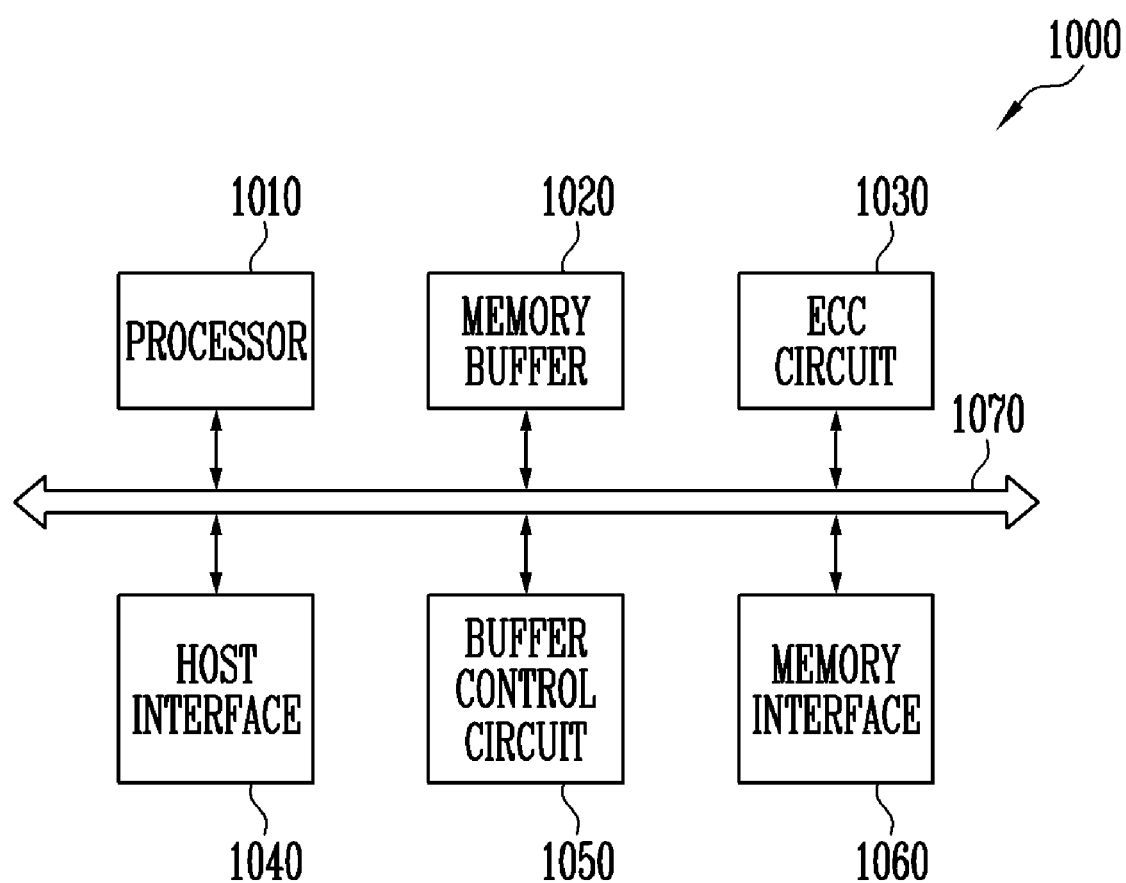

STORAGE DEVICE WHICH STORES WRITE DATA AND AN AUTHENTICATION CODE INTO A PROTECTED MEMORY BLOCK AND METHOD OF OPERATING THE SAME

CROSS-REFERENCE TO RELATED APPLICATION

The present application claims priority under 35 U.S.C. § 119(a) to Korean patent application number 10-2020-0018811, filed on Feb. 17, 2020, which is incorporated herein by reference in its entirety.

BACKGROUND

Field of Invention

Various embodiments of the present disclosure generally relate to an electronic device, and more particularly, to a storage device and a method of operating the storage device.

Description of Related Art

Generally, a storage device stores data under control of a host device such as a computer or a smartphone. The storage device may include a memory device configured to store data, and a memory controller configured to control the memory device. A memory device may be a volatile memory device or a nonvolatile memory device.

A volatile memory device stores data only when power is supplied thereto; data stored therein is lost when power is turned off. Examples of a volatile memory device include a static random access memory (SRAM), and a dynamic random access memory (DRAM).

In a nonvolatile memory device data stored therein is retained even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the present disclosure are directed to a storage device having improved write performance, and a method of operating the storage device.

An embodiment of the present disclosure may provide for a storage device including: a memory device; and a memory controller configured to generate check-in information indicating start of a program operation in response to a write request received from the host, control the memory device to perform a program operation of storing data received from the host in a target area of the memory device, generate check-out information indicating whether the program operation has succeeded, and provide a write result response including the check-out information to the host in response to a write return request received from the host.

An embodiment of the present disclosure may provide for a method of operating a storage device, including: generating check-in information indicating a target area on which a program operation is to be performed, in response to a write request received from a host; providing to the host a write request check response indicating whether the write request has been received; generating authentication information indicating whether the data has integrity using data received from the host and an authentication key; performing the program operation of storing the data in a data area of the target area based on the authentication information; generating check-out information indicating whether the program operation has succeeded; and providing a write result response including the check-out information to the host in response to a result return request received from the host.

An embodiment of the present disclosure may provide for a method of operating a storage device, including: generating check-in information indicating a target area on which a program operation is to be performed, in response to a write request received from a host; providing to the host a write request check response indicating whether the write request has been received; performing the program operation of storing data in a data area of the target area; generating check-out information indicating whether the program operation has succeeded after the program operation has been completed; and providing a write result response including the check-out information to the host in response to a result return request received from the host.

An embodiment of the present disclosure may provide for a method of operating a controller, including: controlling, in response to a secure write request, a memory device to store a provided authentication code and write data into a protected memory block (PMB); authenticating, when powered on after a sudden power off, the stored write data based on the stored authentication code and an authentication key; and controlling, when the authentication is successful, the memory device to store information of the authentication into the PMB.

BRIEF DESCRIPTION OF THE DRAWINGS

FIG. 8 is a diagram for describing an operation performed in response to a write request in accordance with an embodiment.

FIG. 9 is a diagram for describing an operation performed in response to a write request in accordance with an embodiment.

FIG. 10 is a diagram for describing an operation performed in response to a write request in accordance with an embodiment.

FIG. 11 is a diagram for describing a data processing operation when a sudden power-off event occurs.

FIG. 12 is a diagram illustrating an example of a memory controller, such as that of FIG. 1.

DETAILED DESCRIPTION

While various embodiments of the present invention are described below, those skilled in the art will recognize based on the present disclosure that the present invention may be embodied in various other forms and ways. Thus, the present invention is not limited to or by any particular embodiment or detail presented herein. Hereinafter, embodiments of the present invention are described in detail with reference to the attached drawings. Also, throughout the specification, reference to "an embodiment," "another embodiment" or the like is not necessarily to only one embodiment, and different references to any such phrase are not necessarily to the same embodiment(s).

Figure 1:
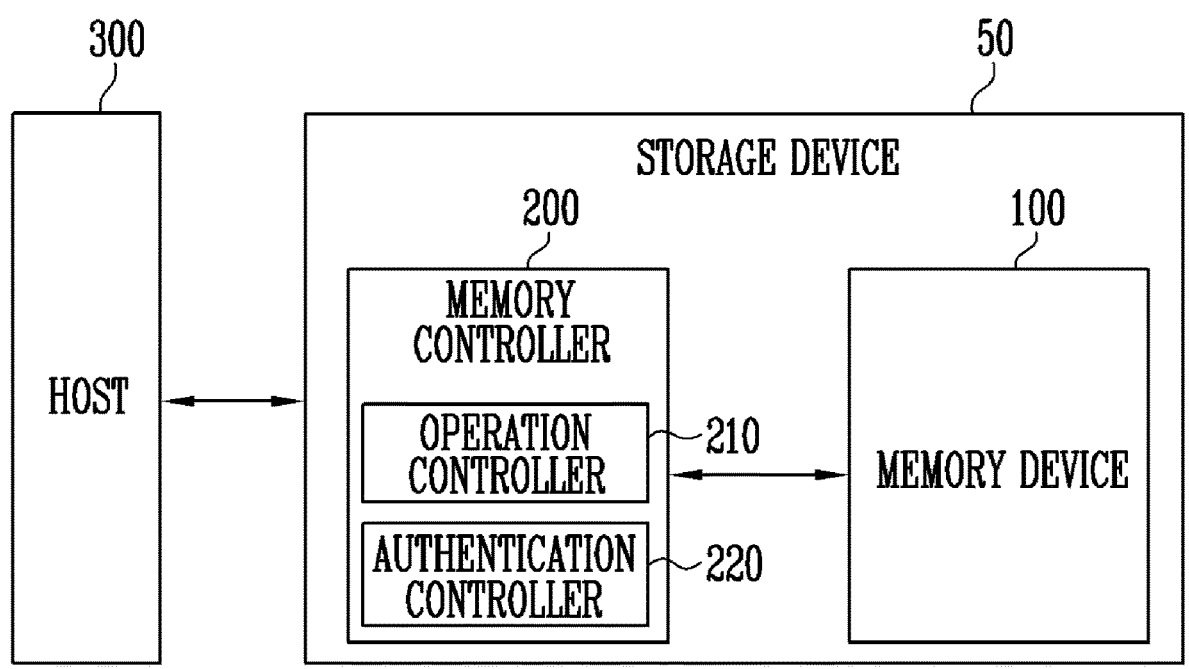
FIG. 1 is a diagram illustrating a storage device in accordance with an embodiment of the present disclosure.

FIG. 1 is a diagram illustrating a storage device 50 in accordance with an embodiment of the present disclosure.

Referring to FIG. 1, the storage device 50 may include a memory device 100 and a memory controller 200 configured to control the operation of the memory device 100. The storage device 50 may be configured to store data under control of a host 300 such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication protocol for communicating with the host 300. For example, the storage device 50 may be configured as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and/or a memory stick.

The storage device 50 may be manufactured in the form of any of various package types. For instance, the storage device 50 may be manufactured in the form of a package on package (POP) type, a system in package (SIP) type, a system on chip (SOC) type, a multi-chip package (MCP) type, a chip on board (COB) type, a wafer-level fabricated package (WFP) type, and/or a wafer-level stack package (WSP) type.

The memory device 100 may store data therein. The memory device 100 may operate under control of the memory controller 200. The memory device 100 may include a memory cell array including a plurality of memory cells configured to store data therein.

A memory cell may be a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100.

Each memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In this specification, by way of example, features and aspects of the invention are described in the context in which the memory device 100 is a NAND flash memory.

The memory device 100 may receive a command and an address from the memory controller 200 and access an area of the memory cell array that is selected by the address. In other words, the memory device 100 may perform an operation instructed by the command on the area selected by the address. For example, the memory device 100 may perform any of a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory controller 200 may control overall operation of the storage device 50.

When power is applied to the storage device 50, the memory controller 200 may execute firmware (FW). In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells in which data is to be stored, the memory cells being included in the memory device 100.

The memory controller 200 may control the memory device 100 to perform a program operation, a read operation, or an erase operation in response to a request from the host 300. During the program operation, the memory controller 200 may provide a write command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a command, an address and data in the absence of a request from the host 300, and transmit them to the memory device 100. For example, the memory controller 200 may provide a command, an address and data to the memory device 100 to perform any of various background operations such as a wear leveling operation or a garbage collection operation.

In an embodiment, the memory controller 200 may control two or more memory devices 100. In this case, the memory controller 200 may control the memory devices 100 in an interleaving manner so as to enhance the operating performance. In an interleaving scheme operating periods of at least two of the memory devices 100 may overlap.

The memory controller 200 may receive a request for a secure write operation from the host 300. In response to each request from the host 300, the memory controller 200 may provide a response corresponding to the request to the host 300. The memory controller 200 may control the memory device 100 to perform the secure write operation.

The memory controller 200 may receive a write request and write data from the host 300. In response to the write request, the memory controller 200 may provide, to the host 300, a write request check response indicating whether the write request has been received. When the write request check response is received from the memory controller 200, the host 300 may provide a result request to the memory controller 200.

The memory controller 200 may receive the result request from the host 300. In response to the result request, the memory controller 200 may provide, to the host 300, a result request check response indicating whether the result request has been received. If the result request check response is received from the memory controller 200, the host 300 may provide a result return request to the memory controller 200.

The memory controller 200 may receive the result return request from the host 300. In response to the result return request, the memory controller 200 may provide, to the host 300, a write result response indicating a result of the write request. The write result response may indicate whether the program operation for the write data has succeeded and whether the write data has integrity. The integrity of the write data may indicate whether or not the received write data has been contaminated or distorted.

In an embodiment, the memory controller 200 may include an operation controller 210 and an authentication controller 220.

The operation controller 210 may generate check-in information indicating that the program operation starts in response to the write request. The check-in information may include information about a target area on which the program operation is to be performed among storage areas of the memory device 100. When a write request is received from the host 300, the operation controller 210 may generate check-in information.

In an embodiment, the check-in information may further include a host authentication code received from the host 300. The host authentication code may be generated based on the write data and an authentication key in the host 300. The authentication key, which may be preset, may be set to the same value between the host 300 and the storage device 50 to generate the authentication code.

The operation controller 210 may generate check-out information indicating whether the program operation for the write data has succeeded. The operation controller 210 may generate the check-out information after the program operation for the write data has been completed. In detail, the check-out information may include program pass/fail information indicating whether the program operation has succeeded. In an embodiment, the check-out information may further include authentication information indicating whether the write data has integrity.

The operation controller 210 may control the memory device 100 to store the check-in information, the write data, and the check-out information in the target area among the storage areas of the memory device 100.

The operation controller 210 may update map data corresponding to the target area based on the check-out information.

For example, the operation controller 210 may determine whether the program operation for the write data has succeeded and the write data has integrity, based on the check-out information. The operation controller 210 may update map data corresponding to the target area if the program operation for the write data succeeds and the write data is determined to have integrity. The operation controller 210 may maintain map data corresponding to the target area without updating the map data if the program operation for the write data fails or the write data is damaged, i.e., does not have integrity.

The operation controller 210 may control the memory device 100 to recover the data when a sudden power off event occurs. The operation controller 210 may control the memory device 100 to read program data stored in the target area of the memory device 100 when the storage device is recovered from the sudden power off event that occurred after the check-in information has been generated. The operation controller 210 may generate check-out information including authentication information indicating whether the program data read from the memory device 100 has integrity.

The authentication controller 220 may verify the integrity of the write data received from the host 300. In detail, the authentication controller 220 may generate authentication information indicating whether the write data has integrity, using the host authentication code, the write data, and the authentication key that are received from the host 300. The authentication key may be set to the same value between the host 300 and the storage device 50 to generate the authentication code.

The authentication controller 220 may generate a device authentication code using the write data and the authentication key. The authentication controller 220 may determine whether the host authentication code received from the host 300 matches the device authentication code.

If the host authentication code matches the device authentication code, the authentication controller 220 may determine that the write data has integrity. In other words, the authentication controller 220 may determine that the write data is valid. If the host authentication code does not match the device authentication code, the authentication controller 220 may determine that the write data has been damaged and thus does not have integrity. In other words, the authentication controller 220 may determine that the write data is invalid.

In an embodiment, the authentication controller 220 may verify the integrity of the program data read from the memory device 100. The authentication controller 220 may generate authentication information indicating whether the program data stored in the target area indicated by the check-in information has integrity.

The authentication controller 220 may generate a device authentication code using the authentication key and the program data read from the memory device 100 when the storage device is recovered from the sudden power off event that occurred after the check-in information has been generated. Here, the authentication controller 220 may determine whether the host authentication code included in the check-in information matches the device authentication code. The authentication controller 220 may generate authentication information indicating whether the program data has integrity, based on a result of the comparison between the host authentication code and the device authentication code.

In various embodiments, the host authentication code and the device authentication code may be generated based on a message authentication code (MAC).

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and/or load reduced DIMM (LRDIMM) communication methods.

Figure 2:
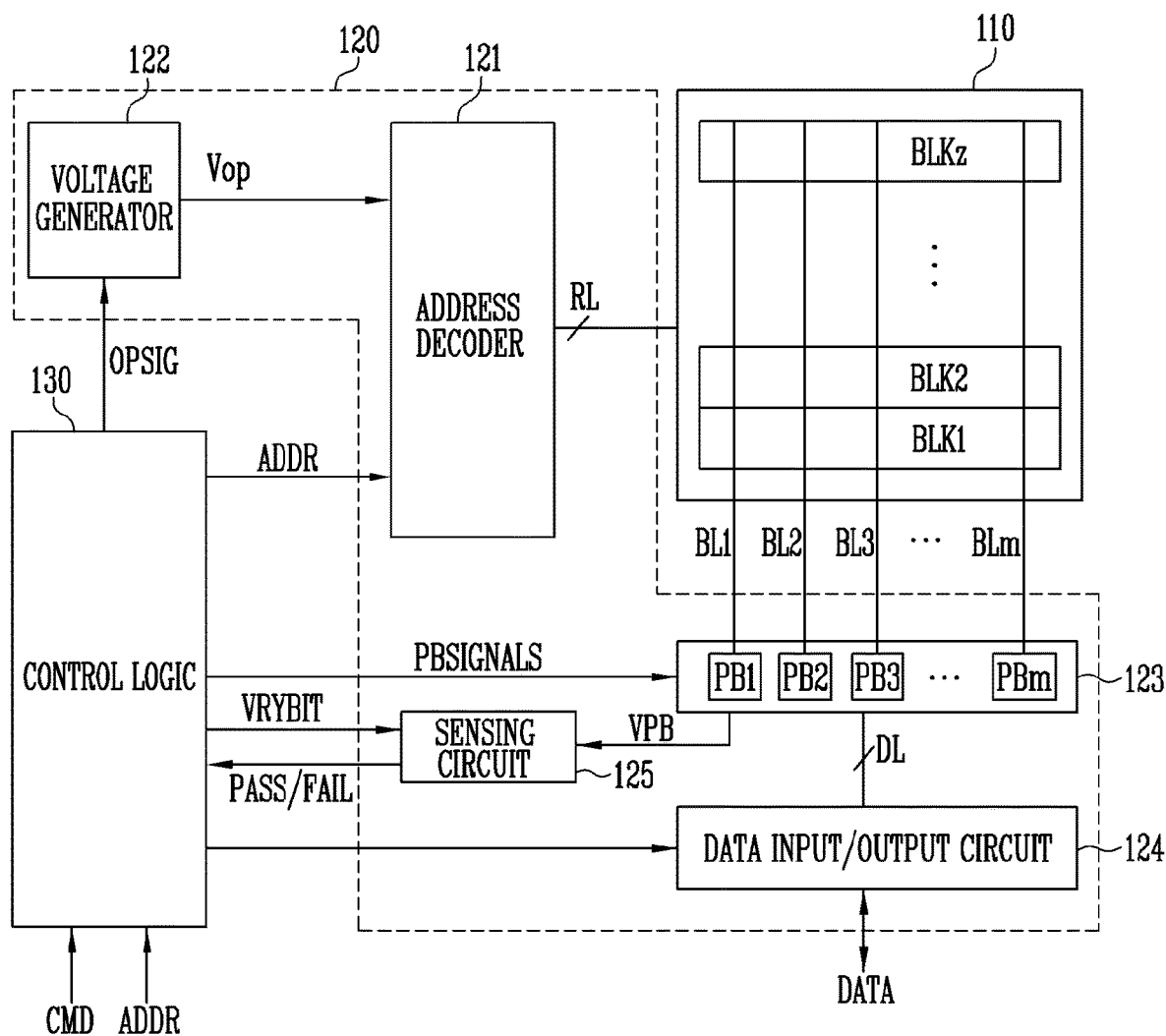
FIG. 2 is a diagram illustrating a configuration of a memory device, such as that of FIG. 1.

FIG. 2 is a diagram illustrating a configuration of the memory device 100 of FIG. 1.

Referring to FIG. 2, the memory device 100 may include a memory cell array 110, a peripheral circuit 120, and control logic 130.

The memory cell array 110 may include a plurality of memory blocks BLK1 to BLKz, which are coupled to the address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 may be formed of a plurality of physical pages. In an embodiment, each of the memory blocks BLK1 to BLKz in the memory cell array 110 may include a plurality of dummy cells. One or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, a read/write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address among the received addresses ADDR. The address decoder 121 may select at least one of the word lines of the selected memory block according to the decoded row address. The address decoder 121 may apply, to the selected word line, an operating voltage Vop supplied with the voltage generator 122.

During a program operation, the address decoder 121 may apply a program voltage to a selected word line and apply a program pass voltage lower than the program voltage to unselected word lines. During a program verify operation, the address decoder 121 may apply a verify voltage to a selected word line and apply a verify pass voltage higher than the verify voltage to unselected word lines.

During a read operation, the address decoder 121 may apply a read voltage to a selected word line and apply a read pass voltage higher than the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select at least one memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required from the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, so as to generate a plurality of operating voltages Vop having various voltage levels, a plurality of pumping capacitors configured to receive an internal supply voltage, and may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm, which may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124.

During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program voltage is applied to a selected word line. The memory cells in the selected page are programmed based on the transmitted data DATA. Memory cells coupled to a bit line to which a program enable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA in the first to m-th page buffers PB1 to PBm.

During an erase operation, the read/write circuit 123 may float the bit lines BL. In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving input data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control overall operation of the memory device 100. The control logic 130 may operate in response to a command CMD transmitted from an external device.

The control circuit 130 may generate various signals in response to the command CMD and the address ADD and control the peripheral circuit 120. For example, in response to the command CMD and the address ADDR, the control logic 130 may generate an operating signal OPSIG, an address ADDR, a read/write circuit control signal PBSIGNALS, and an enable bit VRYBIT. The control logic 130 may output the operating signal OPSIG to the voltage generator 122, output the address ADDR to the address decoder 121, output the read/write control signal to the read/write circuit 123, and output the enable bit VRYBIT to the sensing circuit 125. The control logic 130 may determine whether target memory cells have passed or failed a verification during the verify operation in response to a pass signal PASS or a fail signal FAIL that is output from the sensing circuit 125.

Figure 3:
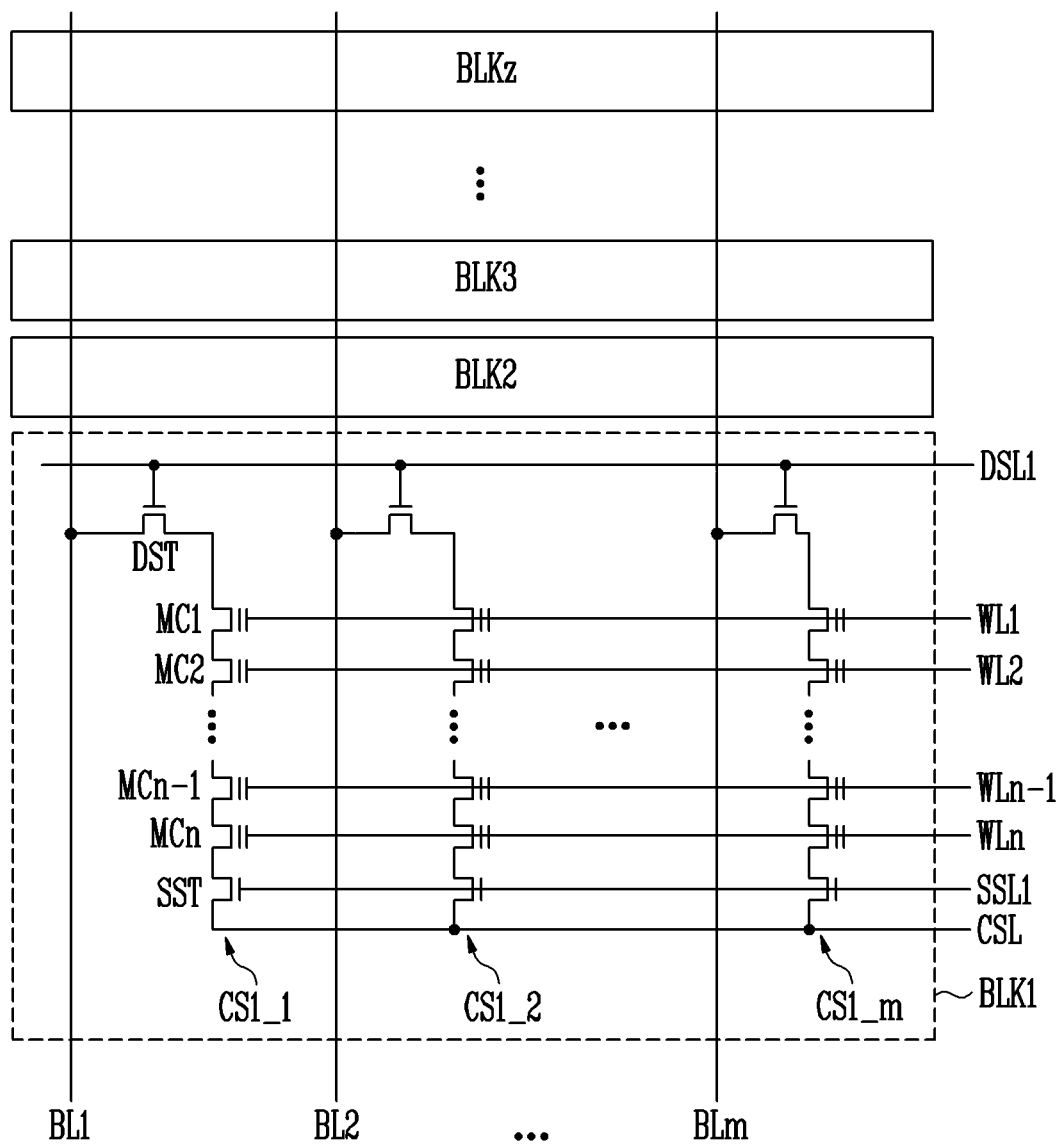
FIG. 3 is a diagram illustrating a memory cell array, such as that of FIG. 2.

FIG. 3 is a diagram illustrating a memory cell array of FIG. 2.

Referring to FIG. 3, the first to z-th memory blocks BLK1 to BLKz are connected in common to the first to m-th bit lines BL1 to BLm. In FIG. 3, by way of example, elements of only the first memory block BLK1 among the plurality of memory blocks BLK1 to BLKz are illustrated, since each of the memory blocks BLK2 to BLKz has the same configuration as that of the first memory block BLK1.

The memory block BLK1 may include a plurality of cell strings $CS1\_1$ to $CS1\_m$ (m is a positive integer). The first to m-th cell strings $CS1\_1$ to $CS1\_m$ are respectively coupled to the first to m-th bit lines BL1 to BLm. Each of the first to m-th cell strings $CS1\_1$ to $CS1\_m$ includes a drain select transistor DST, a plurality of memory cells MC1 to MCn (n is a positive integer) coupled in series to each other, and a source select transistor SST.

A gate terminal of the drain select transistor DST included in each of the first to m-th cell strings $CS1\_1$ to $CS1\_m$ is coupled to a drain select line DSL1. Gate terminals of the first to n-th memory cells MC1 to MCn in each of the first to m-th cell strings $CS1\_1$ to $CS1\_m$ are respectively coupled to the first to n-th word lines WL1 to WLn. A gate terminal of the source select transistor SST included in each of the first to m-th cell strings $CS1\_1$ to $CS1\_m$ is coupled to a source select line SSL1.

By way of example, the configuration of the first cell string $CS1\_1$, of the plurality of cell strings $CS1\_1$ to $CS1\_m$, is described. It will be understood that each of the other cell strings $CS1\_1$ to $CS1\_m$ has the same configuration as that of the first cell string $CS1\_1$.

A drain terminal of the drain selects transistor DST in the first cell string $CS1\_1$ is coupled to the first bit line BL1. A source terminal of the drain selects transistor DST in the first cell string $CS1\_1$ is coupled to a drain terminal of the first memory cell MC1 in the first cell string $CS1\_1$. The first to n-th memory cells MC1 to MCn are coupled in series to each other. A drain terminal of the source selects transistor SST in the first cell string $CS1\_1$ is coupled to a source terminal of the n-th memory cell MCn in the first cell string $CS1\_1$. A source terminal of the source selects transistor SST in the first cell string $CS1\_1$ is coupled to a common source line CSL. In an embodiment, the common source line CSL may be coupled in common to the first to z-th memory blocks BLK1 to BLKz.

The drain selects line DSL1, the first to n-th word lines WL1 to WLn, and the source select line SSL1 are included in the row lines RL of FIG. 2. The drain selects line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read/write circuit 123.

Figure 4:
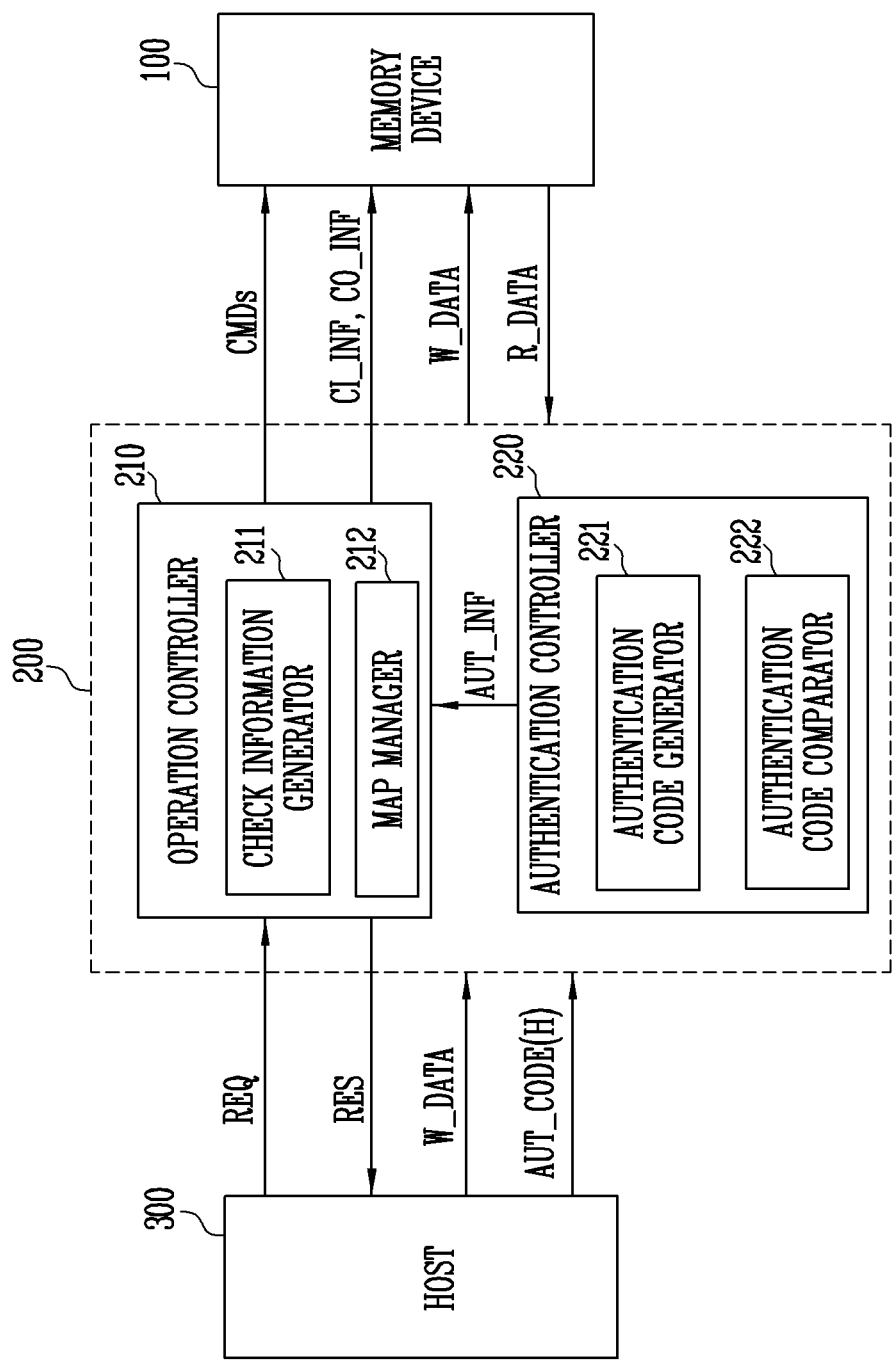
FIG. 4 is a diagram illustrating a configuration and operation of a memory controller, such as that of FIG. 1.

FIG. 4 is a diagram for describing a configuration and operation of the memory controller 200 of FIG. 1.

Referring to FIG. 4, the memory controller 200 may include an operation controller 210 and an authentication controller 220.

The operation controller 210 may receive a request REQ for a secure write operation from the host 300. In response to each request REQ from the host, the operation controller 210 may provide a response RES corresponding to the request REQ to the host 300.

The operation controller 210 may receive a write request and write data W_DATA from the host 300. In response to the write request, the operation controller 210 may provide, to the host 300, a write request check response indicating whether the write request has been received. If the write request check response is received from the operation controller 210, the host 300 may provide a result request to the operation controller 210.

The operation controller 210 may receive the result request from the host 300. In response to the result request, the operation controller 210 may provide, to the host 300, a result request check response indicating whether the result request has been received. If the result request check response is received from the operation controller 210, the host 300 may provide a result return request to the operation controller 210.

The operation controller 210 may receive the result return request from the host 300. In response to the result return request, the operation controller 210 may provide, to the host 300, a write result response indicating a result of the write request based on check-out information CO_INF. In other words, the write result response may include the check-out information CO_INF. The write result response may indicate whether the secure write operation for the write data W_DATA has been successfully performed. In other words, the write result response may indicate whether the write data W_DATA has been successfully programmed on the memory device 100 and whether the write data W_DATA has integrity. The write result response may indicate whether or not the received write data W_DATA has integrity, i.e., whether or not the write data W_DATA has been contaminated or distorted. In an embodiment, the operation controller 210 may determine whether the write data W_DATA has integrity based on the authentication information AUT_INF received from the authentication controller 220.

The operation controller 210 may generate check-in information CI_INF including information indicating a target area on which a program operation corresponding to the write request is to be performed among the storage areas of the memory device 100. In an embodiment, the check-in information CI_INF may further include a host authentication code AUT_CODE(H) received from the host 300. The host authentication code AUT_CODE(H) may be generated based on the write data W_DATA and an authentication key in the host 300. The authentication key, which may be preset in the host 300, may be a value that is set to the same value between the host 300 and the storage device 50 so as to generate the authentication code.

The operation controller 210 may generate check-out information CO_INF indicating whether the program operation for the write data has succeeded. In detail, the check-out information CO_INF may include program pass/fail information indicating whether the program operation has succeeded. In an embodiment, the check-out information CO_INF may include authentication information AUT_INF indicating whether the write data W_DATA has integrity.

The operation controller 210 may update map data corresponding to the target area based on the check-out information CO_INF.

The operation controller 210 may provide commands CMDs for performing the secure write operation to the memory device 100. The operation controller 210 may provide, to the memory device 100, commands CMDs for data recovery when a sudden power off event has occurred.

The operation controller 210 may provide, to the memory device 100, a program command for storing the check-in information CI_INF in a check-in area including a start point in the target area. The operation controller 210 may provide, to the memory device 100, a program command for storing the write data W_DATA in a data area of the target area. The operation controller 210 may provide, to the memory device 100, a program command for storing check-out information CO_INF in a check-out area including an end point in the target area.

The operation controller 210 may provide, to the memory device 100, a command for reading program data stored in the target area of the memory device 100 if the storage device is recovered from a sudden power off event that occurred after the check-in information CI_INF has been generated. The operation controller 210 may receive, from the authentication controller 220, authentication information AUT_INF indicating whether the program data read from the memory device 100 has integrity. The operation controller 210 may generate the check-out information CO_INF including the authentication information AUT_INF indicating whether the program data has the integrity.

In an embodiment, the operation controller 210 may include a check information generator 211 and a map manager 212.

When a write request is received from the host 300, the check information generator 211 may generate check-in information CI_INF. The check information generator 211 may generate check-out information CO_INF when the program operation for the write data W_DATA is completed. In an embodiment, the check information generator 211 may generate check-out information CO_INF including authentication information AUT_INF.

The map manager 212 may update map data corresponding to the target area based on the check-out information CO_INF. For example, the map manager 212 may determine whether the write data W_DATA has been successfully programmed or whether the write data W_DATA has integrity, based on the check-out information CO_INF. The map manager 212 may update map data corresponding to the target area if the write data W_DATA is successfully programmed and it is deemed to have integrity. The map manager 212 may maintain the existing map data corresponding to the target area without updating the existing map data if a program operation for the write data W_DATA fails and the write data W_DATA is damaged, i.e., does not have integrity.

The authentication controller 220 may generate authentication information AUT_INF indicating whether the write data W_DATA has integrity.

In detail, the authentication controller 220 may verify the integrity of the write data W_DATA, using the host authentication code AUT_CODE(H), the write data W_DATA, and the authentication key that are received from the host 300. The authentication key may be a value that is set to the same value between the host 300 and the storage device 50 so as to generate the authentication code.

The authentication controller 220 may generate a device authentication code using the write data W_DATA and the authentication key. The authentication controller 220 may determine whether the host authentication code AUT_CODE(H) received from the host 300 matches the device authentication code. If the host authentication code AUT_CODE(H) matches the device authentication code, the authentication controller 220 may determine that the write data W_DATA has integrity, i.e., such data is not contaminated, damaged or otherwise abnormal. In other words, the write data W_DATA may be determined to be valid. If the host authentication code AUT_CODE(H) does not match the device authentication code, the authentication controller 220 may determine that the write data W_DATA does not have integrity. In other words, the write data W_DATA may be determined to be invalid.

In various embodiments, the host authentication code AUT_CODE(H) and the device authentication code may be generated based on a message authentication code (MAC).

The authentication controller 220 may provide, to the operation controller 210, the authentication information AUT_INF indicating whether the write data W_DATA has integrity.

In an embodiment, the authentication controller 220 may generate a device authentication code using an authentication key and read data R_DATA read from the memory device 100 if the storage device is recovered from the sudden power off that occurred after the check-in information CI_INF has been generated. Here, the read data R_DATA may be data obtained by reading the program data stored in the target area that is indicated by the check-in information CI_INF. The authentication controller 220 may determine whether the host authentication code AUT_CODE(H) included in the check-in information CI_INF matches the device authentication code. The authentication controller 220 may generate authentication information AUT_INF indicating whether the program data has integrity, based on a result of the comparison between the host authentication code AUT_CODE(H) and the device authentication code. The authentication controller 220 may provide, to the operation controller 210, the authentication information AUT_INF indicating whether the program data has integrity.

Figure 5:
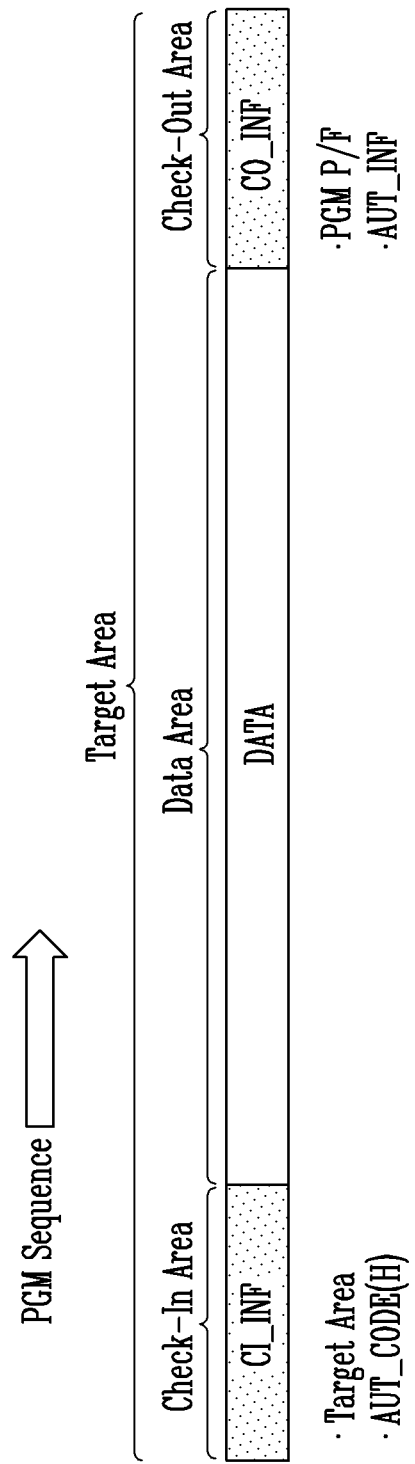
FIG. 5 is a diagram for describing a target area in accordance with an embodiment.

FIG. 5 is a diagram for describing a target area in accordance with an embodiment.

Referring to FIG. 5, the target area may include a check-in area, a data area, and a check-out area. In some embodiments, the target area may be an area in which physical addresses are successive. In some embodiments, the target area may be an area in which logical addresses are successive.

The check-in area may be an area including a start point in the target area. The check-out area may be an area including an end point in the target area. The data area may be an area of the target area other than the check-in area and the check-in area.

The target area may correspond to one or more pages, one or more super pages, one or more memory blocks, or one or more super blocks. However, more generally the target area may correspond to any suitable sized storage area. The storage area unit corresponding to the target area may vary depending on the sizes of check-in information CI_INF, data, and check-out information CO_INF. In an embodiment, a memory block that stores data in a target area according to a message authentication operation may include a replay protected memory block (RPMB).

In an embodiment, the check-in information CI_INF, the data, and the check-out information CO_INF may be successively stored in the target area. In various embodiments, the check-in information and the entirety or some of the data may be simultaneously stored. The check-out information CO_INF may be stored in the check-out area after the data has been stored in the data area.

The check-in information CI_INF may include information indicating the target area. In an embodiment, the check-in information CI_INF may further include a host authentication code AUT_CODE(H). The host authentication code AUT_CODE(H) may be used to recover data from a sudden power off event that occurred after the check-in information CI_INF has been generated.

The check-out information CO_INF may include program pass/fail information PGM P/F indicating whether the program operation has succeeded. In an embodiment, the check-out information CO_INF may further include authentication information AUT_INF indicating whether data received from the host has integrity.

Figure 6:
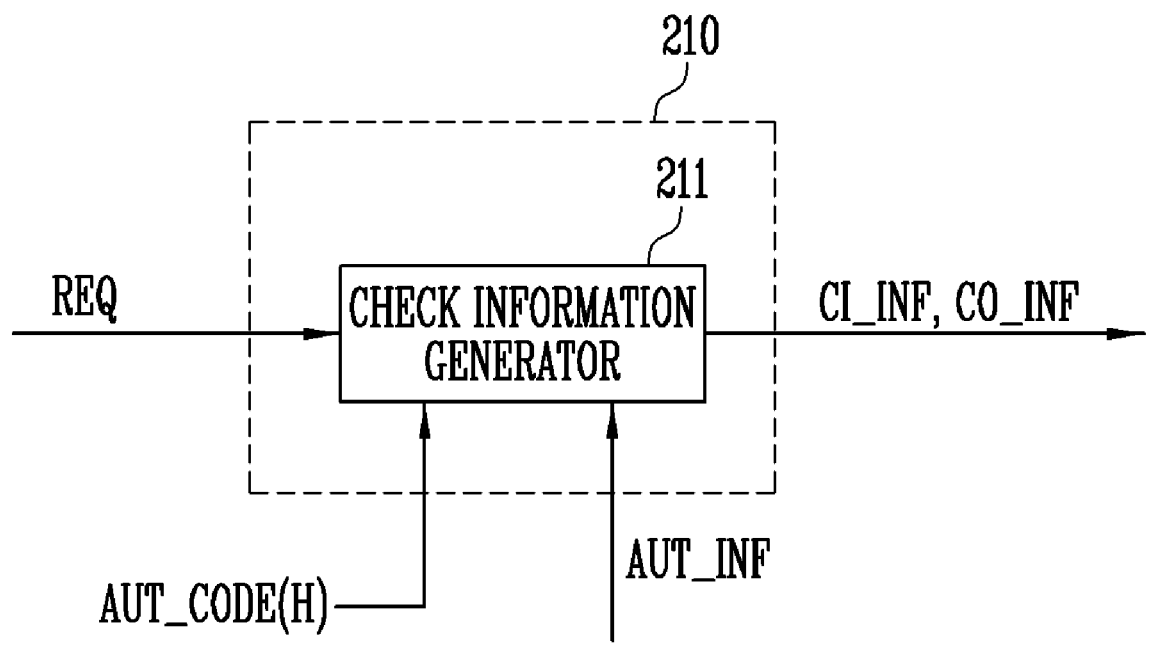
FIG. 6 is a diagram illustrating a check information generator, such as that of FIG. 4.

FIG. 6 is a diagram illustrating the check information generator 211 of FIG. 4.

Referring to FIGS. 4 and 6, the operation controller 210 may include a check information generator 211.

In response to a write request REQ received from the host 300, the check information generator 211 may generate check-in information CI_INF indicating a target area on which an operation corresponding to the write request REQ is to be performed. In detail, the check information generator 211 may generate the check-in information CI_INF including information indicating the target area.

In an embodiment, the check information generator 211 may generate check-in information CI_INF which further includes a host authentication code AUT_CODE(H) received from the host 300. The host authentication code AUT_CODE(H) may be generated based on the write data W_DATA and an authentication key in the host 300. The authentication key may be a value that is set to the same value between the host 300 and the storage device 50 so as to generate the authentication code.

If a program operation for the write data W_DATA is completed, the check information generator 211 may generate check-out information CO_INF indicating whether the program operation has succeeded. In detail, the check information generator 211 may generate check-out information CO_INF including program pass/fail information indicating whether the program operation has succeeded.

In an embodiment, the check information generator 211 may generate the check-out information CO_INF which further includes the authentication information AUT_INF. The authentication information AUT_INF may indicate whether the write data W_DATA received from the host 300 has integrity.

Figure 7A:
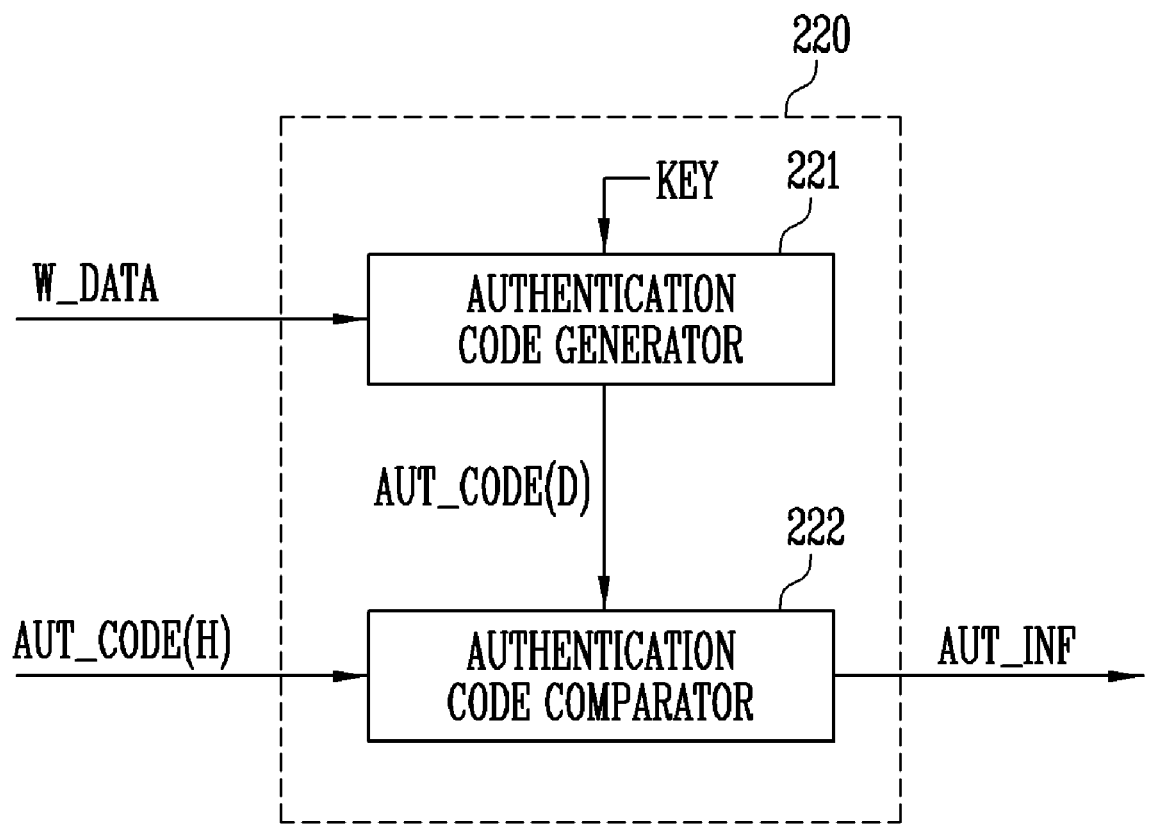
FIG. 7A is a diagram illustrating an authentication controller, such as that of FIG. 4, in accordance with an embodiment.

FIG. 7A is a diagram illustrating the authentication controller 220 of FIG. 4 in accordance with an embodiment.

Referring to FIGS. 4 and 7A, the authentication controller 220 may include an authentication code generator 221 and an authentication code comparator 222.

The authentication code generator 221 may generate a device authentication code AUT_CODE(D) using an authentication key KEY and write data W_DATA received from the host 300. The authentication key KEY may be a value that is set to the same value between the host 300 and the storage device 50 so as to generate the authentication code.

The authentication code generator 221 may provide the generated device authentication code AUT_CODE(D) to the authentication code comparator 222.

The authentication code comparator 222 may receive a host authentication code AUT_CODE(H) from the host 300, and receive a device authentication code AUT_CODE(D) from the authentication code generator 221. The host authentication code AUT_CODE(H) may be an authentication code generated based on the write data W_DATA and the key KEY preset in the host 300.

The authentication code comparator 222 may generate authentication information AUT_INF indicating whether the write data W_DATA has integrity, based on a result of the comparison between the host authentication code AUT_CODE(H) and the device authentication code AUT_CODE(D).

In detail, the authentication code comparator 222 may determine whether the host authentication code AUT_CODE(H) matches the device authentication code AUT_CODE(D). If the host authentication code AUT_CODE(H)

matches the device authentication code, the authentication code comparator 222 may determine that the write data W_DATA has integrity. In other words, the authentication code comparator 222 may determine that the write data W_DATA is valid. If the host authentication code AUT_CODE(H) does not match the device authentication code AUT_CODE(D), the authentication code comparator 222 may determine that the write data W_DATA does not have integrity, i.e., that the write data W_DATA has been damaged. In other words, the authentication code comparator 222 may determine that the write data W_DATA is invalid.

In various embodiments, the host authentication code AUT_CODE(H) and the device authentication code AUT_CODE(D) may be generated based on a message authentication code (MAC).

Figure 7B:
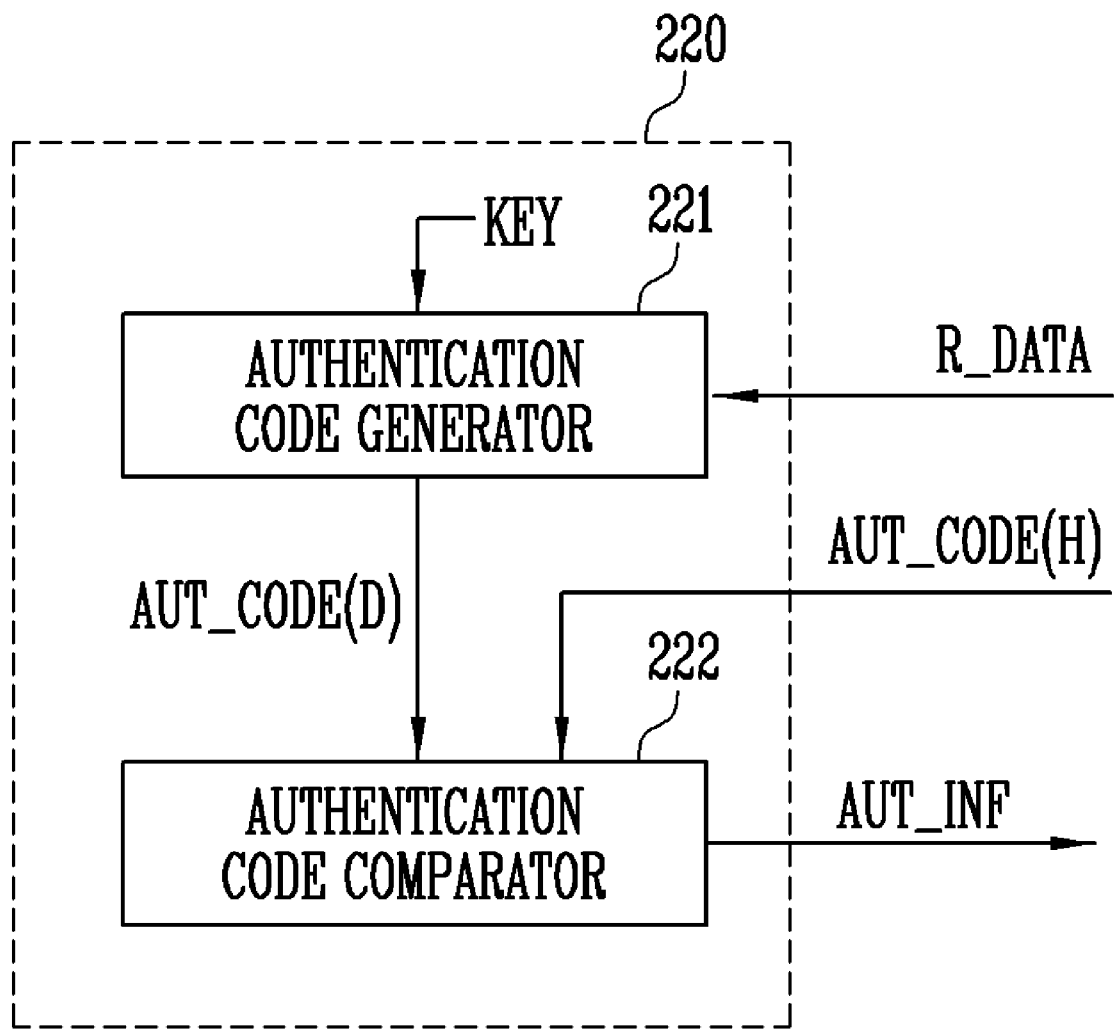
FIG. 7B is a diagram illustrating an authentication controller, such as that of FIG. 4, in accordance with another embodiment.

FIG. 7B is a diagram illustrating the authentication controller 220 of FIG. 4 in accordance with an embodiment.

Referring FIG. 7B, the authentication controller 220 may have the same configuration as that of the authentication controller 220 described with reference to FIG. 7A.

The authentication code generator 221 may generate device authentication code AUT_CODE(D) using an authentication key KEY and read data R_DATA read from the memory device 100 described with reference to FIG. 4. Here, the read data R_DATA may be data obtained by reading the program data stored in the target area that is indicated by the check-in information CI_INF. The authentication key may be a value that is set to the same value between the host 300 and the storage device 50 so as to generate the authentication code.

The authentication code comparator 222 may obtain the host authentication code AUT_CODE(H) included in the check-in information CI_INF from the memory device 100. The authentication code comparator 222 may receive the device authentication code AUT_CODE(D) from the authentication code generator 221.

The authentication code comparator 222 may generate authentication information AUT_INF indicating whether the read data R_DATA has integrity, based on a result of the comparison between the host authentication code AUT_CODE(H) and the device authentication code AUT_CODE(D).

In an embodiment, the authentication information AUT_INF indicating the integrity of the read data R_DATA may be used to recover data from a sudden power off event that occurred after the check-in information CI_INF has been generated.

FIG. 8 is a diagram for describing an operation which is performed in response to a write request in accordance with an embodiment.

Referring to FIG. 8, at step S801, the storage device 50 may receive a write request from the host 300. The write request may be a request for a secure write operation. The storage device 50 may receive write data and a host authentication code along with the write request from the host 300.

At step S803, the storage device 50 may generate a device authentication code using an authentication key and the write data, as described with reference to FIG. 7A.

At step S805, the storage device 50 may determine whether the write data is valid. If the write data is valid, the process may proceed to step S807. If the write data is invalid, the process may proceed to step S809.

In detail, the storage device 50 may determine whether the device authentication code matches the host authentication code. If the device authentication code matches the host authentication code, the storage device 50 may determine that the write data has integrity, i.e., that the write data is not damaged. In other words, the storage device 50 may determine that the write data is valid. If the device authentication code does not match the host authentication code, the storage device 50 may determine that the write data has been damaged, and thus lacks integrity. In other words, the storage device 50 may determine that the write data is invalid.

At step S807, the storage device 50 may perform a program operation for the write data.

At step S809, the storage device 50 may generate program pass/fail information indicating whether the program operation has succeeded. If the storage device 50 determines that the write data is invalid at step S805, the program operation is not performed. Therefore, at step S809, the storage device 50 may determine that the program operation has failed.

At step S811, the storage device 50 may update map data based on the program pass/fail information. In detail, the storage device 50 may determine whether the program operation has passed or failed based on the program pass/fail information. If the program operation has passed, the storage device 50 may update the map data corresponding to the target area on which the program operation has been performed. If the program operation has failed, the storage device 50 may maintain the existing map data corresponding to the target area on which the program operation has been performed, without updating the existing map data.

At step S813, the storage device 50 may provide, to the host 300, a write request check response indicating whether the write request has been received.

At step S815, the storage device 50 may receive a result request from the host 300.

At step S817, the storage device 50 may provide, to the host 300, a result request check response indicating whether the result request has been received.

At step S819, the storage device 50 may receive a result return request from the host 300.

At step S821, the storage device 50 may provide, to the host 300, a write result response indicating a result obtained in response to the write request. The write result response may indicate whether the program operation for the write data in response to the write request has been successfully performed.

FIG. 9 is a diagram for describing an operation which is performed in response to a write request in accordance with an embodiment.

Referring to FIG. 9, at step S901, the storage device 50 may receive a write request from the host 300. The write request may be a request for a secure write operation. The storage device 50 may receive write data and a host authentication code along with the write request from the host 300.

At step S903, the storage device 50 may generate check-in information indicating a target area on which a program operation is to be performed in response to the write request.

At step S905, the storage device 50 may provide, to the host 300, a write request check response indicating whether the write request has been received.

At step S907, the storage device 50 may receive a result request from the host 300.

At step S909, the storage device 50 may provide, to the host 300, a result request check response indicating whether the result request has been received.

At step S911, the storage device 50 may receive a result return request from the host 300.

At step S913, the storage device 50 may generate authentication information indicating whether the write data has integrity. Step S905 and step S913 may be simultaneously performed. Alternatively, step S905 and step S913 may be performed in parallel. As a further alternative, some of the operation periods of step S905 and step S913 may overlap with each other.

At step S915, the storage device 50 may perform a program operation for the write data based on the authentication information. In detail, the storage device 50 may determine whether the write data has integrity based on the authentication information. The storage device 50 may perform a program operation if the write data is determined to have integrity. The storage device 50 may not perform a program operation if the integrity of the write data is not verified, i.e., if the write data is damaged.

At step S917, the storage device 50 may generate check-out information indicating whether the program operation has succeeded. In detail, the storage device 50 may generate the check-out information including program pass/fail information indicating whether the program operation has succeeded. If the storage device 50 determines that the write data has been damaged at step S915, the program operation is not performed. Therefore, at step S917, the storage device 50 may determine that the program operation has failed.

At step S919, the storage device 50 may update map data based on the check-out information. In detail, the storage device 50 may determine whether the program operation has passed or failed based on the check-out information. If the program operation has passed, the storage device 50 may update the map data corresponding to the target area on which the program operation has been performed. If the program operation has failed, the storage device 50 may maintain the existing map data corresponding to the target area on which the program operation has been performed, without updating the existing map data.

At step S921, the storage device 50 may provide, to the host 300, a write result response indicating a result obtained in response to the write request based on the check-out information. The write result response may indicate whether the program operation for the write data in response to the write request has been successfully performed.

Referring to FIG. 8, if at step S801 a write request is received from the host 300, the storage device 50 may perform operations corresponding to the write request at step S803 to S811, and then provide a write request check response to the host 300 at step S813. Thereafter, the storage device 50 may perform communication with the host 300 at step S813 to S821.

In an embodiment of FIG. 9, if at step S901 the write request is received from the host 300, the storage device 50 may generate check-in information at step S903. Thereafter, the storage device 50 may perform communication (S905 to S911) with the host 300 while performing the operations S913 to S919 corresponding to the write request. Therefore, compared to the embodiment of FIG. 8, in the embodiment of FIG. 9, the entire transaction time from the write request to the write result response may be reduced by time for which the communication with the host 300 overlaps with the operations corresponding to the write request.

FIG. 10 is a diagram for describing an operation which is performed in response to a write request in accordance with an embodiment.

Referring to FIG. 10, at step S1001, the storage device 50 may receive a write request from the host 300. The write request may be a request for a secure write operation. The storage device 50 may receive write data and a host authentication code along with the write request from the host 300.

At step S1003, the storage device 50 may generate check-in information indicating a target area on which a program operation is to be performed in response to the write request.

At step S1005, the storage device 50 may provide, to the host 300, a write request check response indicating whether the write request has been received.

At step S1007, the storage device 50 may receive a result request from the host 300.

At step S1009, the storage device 50 may provide, to the host 300, a result request check response indicating whether the result request has been received.

At step S1011, the storage device 50 may receive a result return request from the host 300.

At step S1013, the storage device 50 may perform a program operation for the write data.

At step S1015, the storage device 50 may generate authentication information indicating whether the write data has integrity. In an embodiment, step S1005, step S1013, and step S1015 may be simultaneously performed. Alternatively, step S1005, step S1013, and step S1015 may be performed in parallel. As a further alternative, some of the respective operation periods of step S1005, step S1013, and step S1015 may overlap with each other.

At step S1017, the storage device 50 may generate check-out information indicating whether the program operation performed at step S1013 has succeeded and the write data has integrity. In detail, the storage device 50 may generate the check-out information including program pass/fail information indicating whether the program operation performed at step S1013 has succeeded and authentication information generated at step S1015.

At step S1019, the storage device 50 may update map data based on the check-out information. In detail, the storage device 50 may determine whether the program operation has passed or failed and the write data has integrity, based on the check-out information. If the program operation has passed and the write data is determined to have integrity, the storage device 50 may update the map data corresponding to the target area on which the program operation has been performed. If the program operation has failed and the write data is damaged and thus lacks integrity, the storage device 50 may maintain the existing map data corresponding to the target area on which the program operation has been performed, without updating the existing map data.

At step S1021, the storage device 50 may provide, to the host 300, a write result response indicating a result obtained in response to the write request based on the check-out information. The write result response may indicate whether the program operation for the write data in response to the write request has been successfully performed and whether the write data has integrity.

Compared to the embodiment of FIG. 9, the check-out information of FIG. 10 may additionally include authentication information as well as the program pass/fail information. In the embodiment of FIG. 9, the program operation is performed (at step S915) after the authentication information has been generated (at step S913). However, in the embodiment of FIG. 10, the program operation (S1013) may be performed in parallel with generation of the authentication information (S1015) Therefore, compared to the embodiment of FIG. 9, in the embodiment of FIG. 10, the entire transaction time from the write request to the write result response may be reduced by time for which the program operation overlaps with the generation of the authentication information.

FIG. 11 is a diagram for describing a data processing operation when a sudden power-off event occurs.

Referring to FIG. 11, at step S1101, after the check-in information has been generated, a sudden power off event may occur on the storage device.

At step S1103, if the storage device is recovered from the sudden power off event, the storage device may determine whether check-out information corresponding to check-in information is present. If a result of the determination indicates that the check-out information is present, the process may be terminated. If there is no check-out information, the process may proceed to step S1105.

At step S1105, the storage device may read program data stored in the target area based on the check-in information. The check-in information may include information indicating the target area on which the program operation has been performed.

At step S1107, the storage device may determine whether a read operation for program data has succeeded. If the read operation has succeeded, the process may proceed to step S1109. If the read operation has failed, the process may proceed to step S1115. The success of the read operation may indicate success of the program operation for the program data. Failure of the read operation may indicate failure of the program operation for the program data.

At step S1109, the storage device may generate a device authentication code using read data and an authentication key. The authentication key may be a value that is set to the same value between the host and the storage device so as to generate the authentication code.

At step S1111, the storage device may determine whether the generated device authentication code matches the host authentication code included in the check-in information. As a result of the determination, if the device authentication code matches the host authentication code, the process may proceed to step S1113. If the device authentication code does not match the host authentication code, the process may proceed to step S1115. The match between the device authentication code and the host authentication code may indicate that the program data has integrity.

The mismatch between the device authentication code and the host authentication code may indicate that the program data has been damaged and thus lacks integrity.

At step S1113, it may be determined that the secure write operation in response to the write request has succeeded.

At step S1115, it may be determined that the secure write operation in response to the write request has failed.

At step S1117, the storage device 50 may generate check-out information indicating whether the program operation performed before occurrence of the sudden power off event has succeeded and whether the program data has integrity. If the secure write operation has succeeded (at step S1113), the storage device may determine that the program operation has succeeded and the program data has integrity. If the secure write operation has failed (at step S1115), the storage device may determine that the program operation has failed and the program data is damaged and thus lacks integrity.

At step S1119, the storage device may update map data based on the check-out information. In detail, the storage device may determine whether the program operation has passed or failed and whether the program data has integrity, based on the check-out information. If the program operation has passed and the program data is deemed to have integrity, the storage device may update the map data corresponding to the target area on which the program operation has been performed. If the program operation has failed and the write data is damaged, the storage device may maintain the existing map data corresponding to the target area on which the program operation has been performed, without updating the existing map data.

In accordance with the embodiment of FIG. 11, when a sudden power off event occurs after the check-in information has been generated, the storage device may determine whether data programmed before the sudden power off occurrence has integrity and whether the program operation has succeeded, based on the check-in information without intervention of the host. The storage device may determine whether to recover or discard the program data based on a result of determining whether the programmed data has integrity and whether the program operation has succeeded.

FIG. 12 is a diagram illustrating an example of the memory controller of FIG. 1.

Referring to FIG. 12, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Any suitable address mapping method using the FTL may be used depending on the unit of mapping. Representative address mapping methods include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be stored in the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and/or a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 may include neither the memory buffer 1020 nor the buffer control circuit 1050. One or both of these components may be provided separately.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other such that neither interferes with, nor affects, the other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the operation controller 210 and the authentication controller 220 described with reference to FIG. 1 may be included in the processor 1010.

Figure 13:
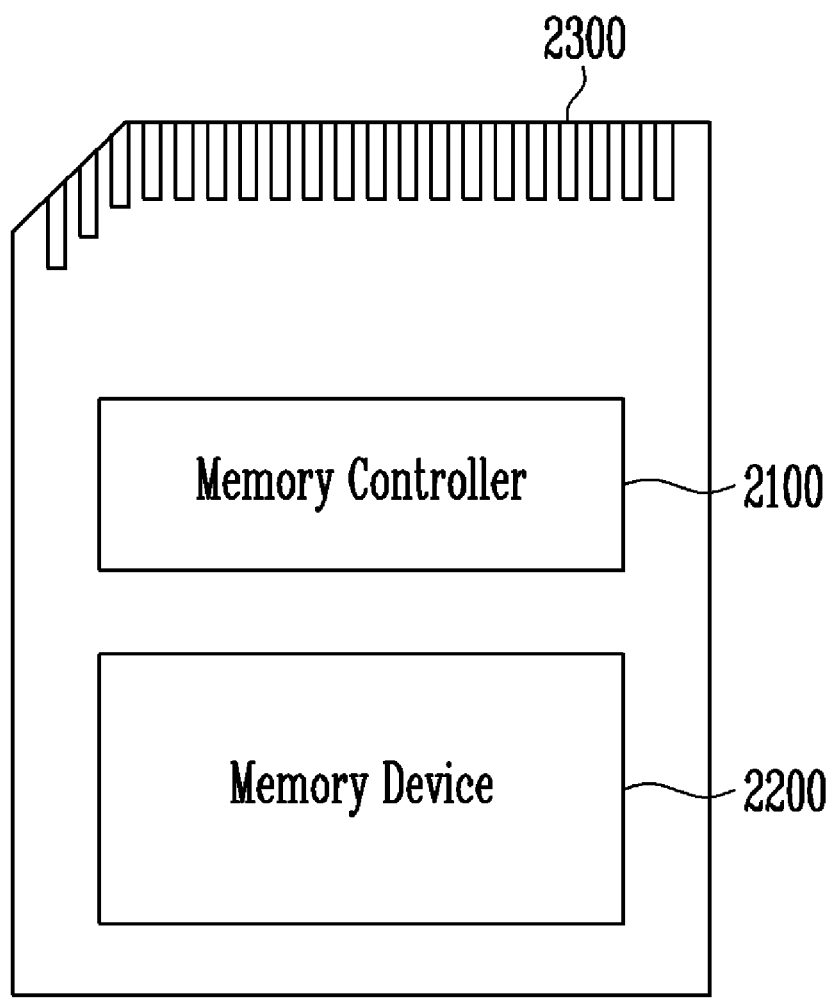
FIG. 13 is a block diagram illustrating a memory card system to which the storage device is applied in accordance with an embodiment of the present disclosure.

FIG. 13 is a block diagram illustrating a memory card system 2000 to which the storage device is applied in accordance with an embodiment of the present disclosure.

Referring FIG. 13, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory controller 2100 may be configured the same as the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and/or nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin-torque magnetic RAM (STT-MRAM).

In an embodiment, the memory controller 2100 and the memory device 2200 may be integrated into a single semiconductor device to form a memory card, such as a personal computer memory card international association (PCM-CIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 14:
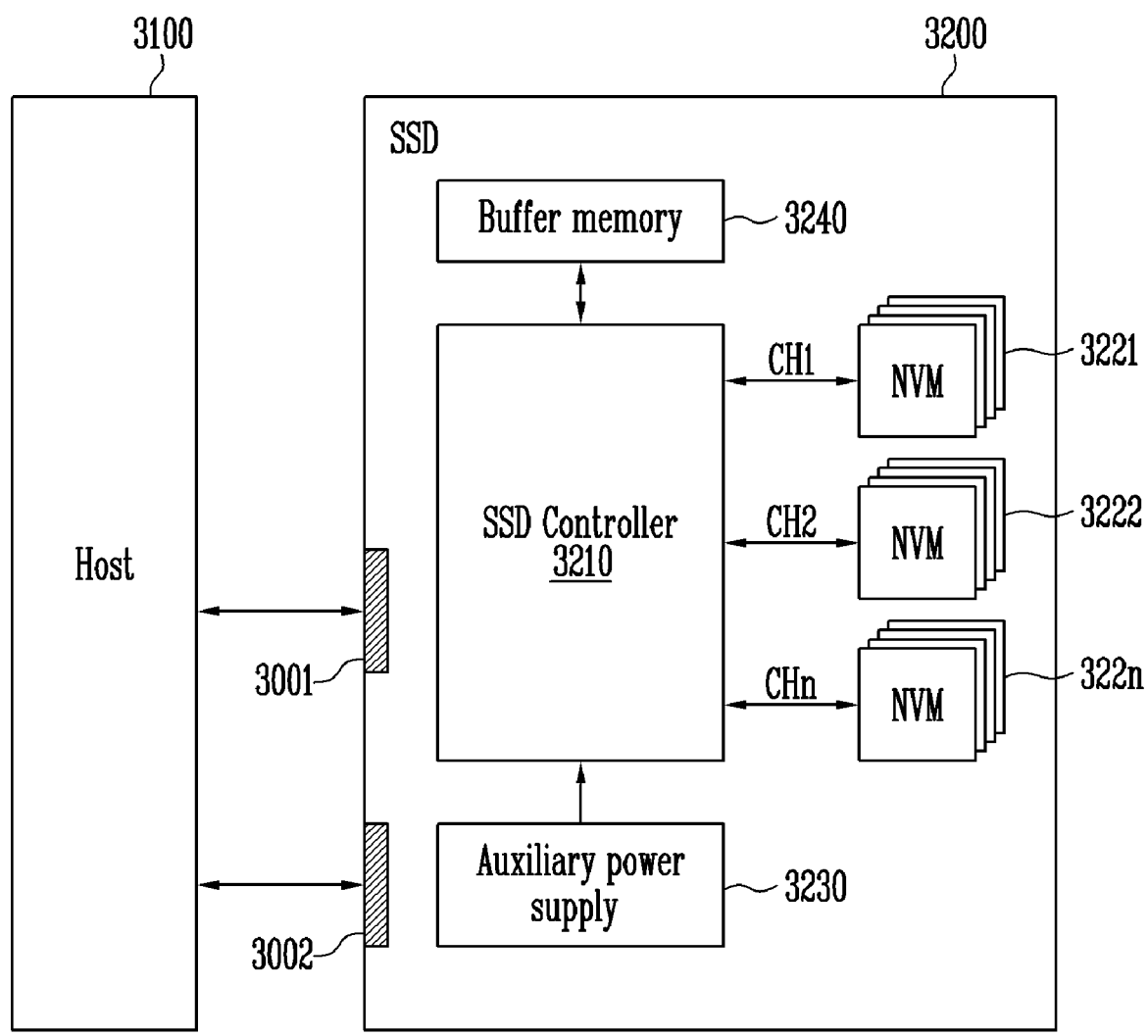
FIG. 14 is a block diagram illustrating a solid state drive (SSD) system to which the storage device is applied in accordance with an embodiment of the present disclosure.

FIG. 14 is a block diagram illustrating a solid state drive (SSD) system 3000 to which the storage device is applied in accordance with an embodiment of the present disclosure.

Referring to FIG. 14, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be based on an interface between the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and/or nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when power from the host 3100 is not smoothly delivered. In an embodiment, the auxiliary power supply 3230 may be disposed within the SSD 3200, or in another embodiment, disposed externally to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include any of various volatile memories such as a DRAM, an SDRAM, a DDR SDRAM, an LPDDR SDRAM, and a GRAM or nonvolatile memories such as an FRAM, a ReRAM, an STT-MRAM, and/or a PRAM.

Figure 15:
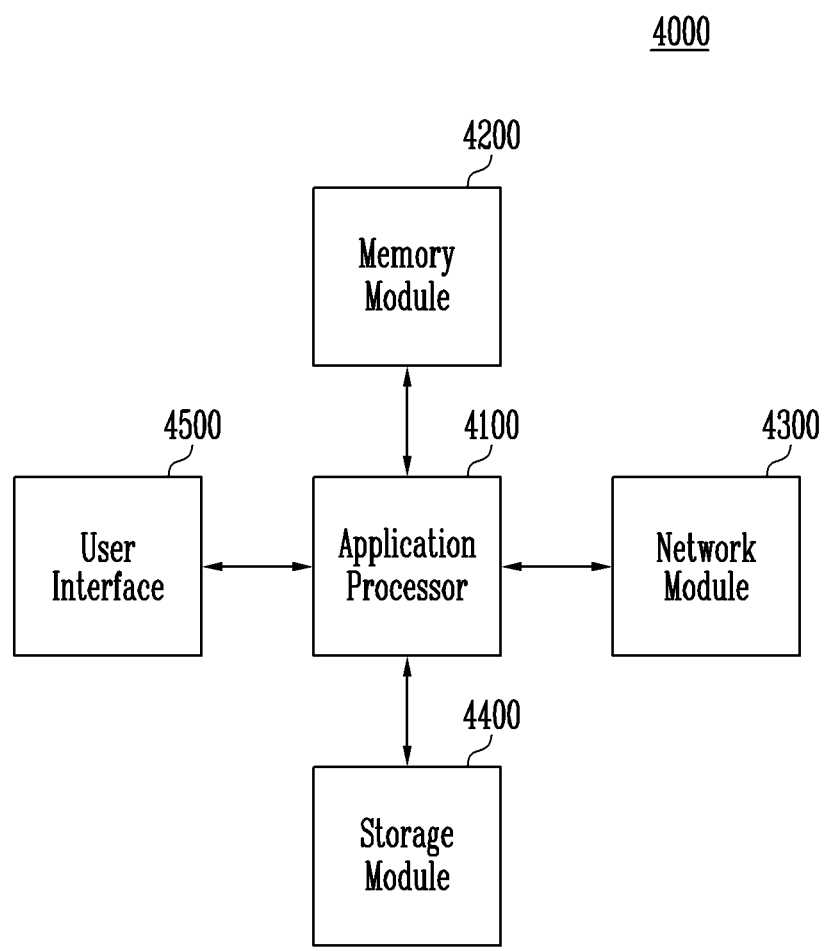
FIG. 15 is a block diagram illustrating a user system to which the storage device is applied in accordance with an embodiment of the present disclosure.

FIG. 15 is a block diagram illustrating a user system 4000 to which the storage device is applied in accordance with an embodiment of the present disclosure.

Referring to FIG. 15, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of which may be operated in the same manner as the memory device 100 described above with reference to FIG. 1. The storage module 4400 may be operated in the same manner as the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and/or a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and/or a monitor.

As described above, various embodiments of the present disclosure provide a storage device having improved write performance, and a method of operating the storage device.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device comprising:
a memory device; and
a memory controller configured to:
generate check-in information indicating start of a program operation and a target area on which a program operation is to be performed in response to a write request received from a host,
control the memory device to perform the program operation of storing data received from the host in the target area of the memory device,
generate check-out information indicating whether the program operation has succeeded, and
provide a write result response including the check-out information to the host in response to a write return request received from the host, wherein the memory device is configured to store the check-in information, the data and the check-out information successively in the target area.

2. The storage device according to claim 1, wherein the memory controller comprises:
   an operation controller configured to control the memory device to store the check-in information, the check-out information, and the data in the target area; and
   an authentication controller configured to generate authentication information indicating whether the data has integrity using a host authentication code received from the host, the data, and an authentication key.

3. The storage device according to claim 2, wherein the operation controller controls the memory device to store the check-in information in a check-in area including a start point in the target area, store the check-out information in a check-out area including an end point in the target area, and store the data in a data area in the target area.

4. The storage device according to claim 2, wherein the operation controller provides to the host a write request check response indicating whether the write request has been received in response to the write request, provides to the host a result request check response indicating whether a result request has been received in response to the result request received from the host, and provides to the host the write result response indicating a result of the write request in response to a result return request.

5. The storage device according to claim 2, wherein the operation controller comprises:
   a check information generator configured to generate the check-in information including information about the target area in response to the write request, and generate the check-out information including the authentication information after the program operation is completed;
   a map manager configured to update map data corresponding to the target area based on the check-out information.

6. The storage device according to claim 2, wherein the authentication controller comprises:
   an authentication code generator configured to generate a device authentication code using the data and the authentication key; and
   an authentication code comparator configured to generate the authentication information based on whether the device authentication code matches the host authentication code.

7. The storage device according to claim 2, wherein the operation controller controls the memory device to read program data stored in the target area based on the check-in information if the storage device is recovered from a sudden power off event that occurred after the check-in information has been generated, generates the check-out information including authentication information indicating whether the program data has integrity, and updates map data corresponding to the target area based on the check-out information.

8. The storage device according to claim 7, wherein the authentication controller generates a device authentication code using the program data and the authentication key, and generates the authentication information indicating whether the program data has integrity based on a result of comparison between the device authentication code and a host authentication code included in the check-in information.

9. A method of operating a storage device, comprising:
   generating check-in information indicating start of a program operation and a target area on which the program operation is to be performed, in response to a write request received from a host;
   providing to the host a write request check response indicating whether the write request has been received;
   performing the program operation of storing data in a data area of the target area;
   generating check-out information indicating whether the program operation has succeeded after the program operation has been completed; and
   providing a write result response including the check-out information to the host in response to a result return request received from the host,
   wherein the check-in information, the data and the check-out information are successively stored in the target area.

10. The method according to claim 9, further comprising:
    storing the check-in information in a check-in area including a start point in the target area;
    storing the check-out information in a check-out area including an end point in the target area.

11. The method according to claim 9, further comprising, after the generating of the check-in information:
    generating authentication information indicating whether the data has integrity using the data received from the host and an authentication key.

12. The method according to claim 11, wherein the generating of the authentication information is performed in parallel with the performing of the program operation.

13. The method according to claim 11, wherein the generating of the authentication information comprises:
    generating a device authentication code using the data and the authentication key; and
    generating the authentication information based on a result of comparison between the device authentication code and a host authentication code received from the host.

14. The method according to claim 9, further comprising, after the providing of the write request check response to the host:
    providing to the host, in response to a result request received from the host, a result request check response indicating whether the result request has been received.

15. The method according to claim 9, further comprising:
    reading program data stored in the target area based on the check-in information if the storage device is recovered from a sudden power off that occurred after generating the check-in information;
    generating a device authentication code using the program data and an authentication key;
    generating authentication information indicating whether the program data has integrity based on a result of comparison between the device authentication code and a host authentication code included in the check-in information;
    generating the check-out information including the authentication information indicating whether the program data has integrity; and
    updating map data corresponding to the target area based on the check-out information.

16. A method of operating a storage device, comprising:
    generating check-in information indicating start of a program operation and a target area on which the program operation is to be performed, in response to a write request received from a host;
    providing to the host a write request check response indicating whether the write request has been received;

generating authentication information indicating whether data has integrity using the data received from the host and an authentication key;

performing the program operation of storing the data in a data area of the target area based on the authentication information;

generating check-out information indicating whether the program operation has succeeded; and providing a write result response including the check-out information to the host in response to a result return request received from the host, wherein the check-in information, the data and the check-out information are successively stored in the target area.

17. The method according to claim 16, further comprising:

storing the check-in information in a check-in area including a start point in the target area; and storing the check-out information in a check-out area including an end point in the target area.

18. The method according to claim 16, wherein the generating of the authentication information comprises:

generating a device authentication code using the data and the authentication key; and generating the authentication information based on a result of comparison between the device authentication code and a host authentication code received from the host.

19. The method according to claim 16, further comprising:

reading program data stored in the target area based on the check-in information if the storage device is recovered from a sudden power off that occurred after generating the check-in information;

generating a device authentication code using the program data and the authentication key;

generating authentication information indicating whether the program data has integrity based on a result of comparison between the device authentication code and a host authentication code included in the check-in information;

generating the check-out information including the authentication information indicating whether the program data has integrity; and updating map data corresponding to the target area based on the check-out information.

20. The method according to claim 16, further comprising, after the providing of the write request check response to the host:

providing to the host, in response to a result request received from the host, a result request check response indicating whether the result request has been received.

* * * * *